United States Patent [19]

Bossenmaier

[11] Patent Number: 4,929,137

[45] Date of Patent: May 29, 1990

[54] SAFETY ARRANGEMENT FOR PROVING THE UNAUTHORIZED OPENING OF A HOUSING

[75] Inventor: Alban Bossenmaier, Stuttgart, Fed. Rep. of Germany

[73] Assignee: Dasmler-Benz AG, Fed. Rep. of Germany

[21] Appl. No.: 122,364

[22] Filed: Nov. 18, 1987

[30] Foreign Application Priority Data

Nov. 21, 1986 [DE] Fed. Rep. of Germany ....... 3639870

[51] Int. Cl.$^5$ .............................................. F16B 19/04
[52] U.S. Cl. .................................... 411/501; 411/502; 411/183; 411/910; 174/53; 52/787; 403/406.1; 403/408.1
[58] Field of Search ................ 411/501, 500, 502–506, 411/910, 900, 367, 338, 533, 103, 105; 52/511, 787; 174/52 R, 53; 220/3.8; 70/57; 403/406.1, 405.1, 408.1

[56] References Cited

U.S. PATENT DOCUMENTS

| | | | |
|---|---|---|---|
| 1,947,839 | 2/1934 | Fissell | 411/501 X |
| 2,160,374 | 5/1939 | Veillette | 411/501 X |
| 2,328,708 | 9/1943 | Cook et al. | 411/501 X |
| 2,465,654 | 3/1949 | Millard | 411/501 X |
| 2,987,909 | 6/1961 | Shlank | 70/57 X |
| 3,103,547 | 9/1963 | Ansley | 411/501 X |
| 3,445,929 | 5/1969 | Wolf | 411/501 X |
| 3,452,149 | 6/1969 | Rinaldi | 411/501 X |
| 4,130,369 | 12/1978 | Wojcik | 411/501 X |
| 4,198,014 | 4/1980 | Oishi et al. | 411/501 X |
| 4,411,169 | 10/1983 | Takeda | 411/501 X |
| 4,473,714 | 9/1984 | Brownell et al. | 411/501 X |

FOREIGN PATENT DOCUMENTS

8520327 11/1985 Fed. Rep. of Germany .

OTHER PUBLICATIONS

Besser als die VDE-Bestimmungen.

*Primary Examiner*—Gary L. Smith
*Assistant Examiner*—F. Saether
*Attorney, Agent, or Firm*—Evenson, Wands, Edwards, Lenahan & McKeown

[57] ABSTRACT

A safety rivet arrangement for indicating the unauthorized opening of a housing whose wall parts are connected with each other at a separating joint which has a covered outer edge. A safety rivet extends through the connection and is considerably harder than the material of the housing wall parts. The rivet ends are arranged recessed, and the safety rivet is also only loosely peened-over so as to be rotatable. By reason of its high material hardness, and the rotatable arrangement, the rivet cannot be drilled out with some evidence of the drilling.

14 Claims, 1 Drawing Sheet

SAFETY ARRANGEMENT FOR PROVING THE UNAUTHORIZED OPENING OF A HOUSING

BACKGROUND AND SUMMARY OF THE INVENTION

The present invention relates to a safety arrangement for preventing the unauthorized opening of a housing, in which wall parts are connected flange-like or cover-like with each other and are riveted together by at least one safety rivet made of a harder material than the material of at least one of the connected wall parts and removable only by destruction, as are known, for example, with screwless multi-contact sockets in extension cables for the home use.

Other technically more demanding industrial products are frequently also secured against unauthorized opening by such types of safety arrangements, whereby added thereto is the purpose of the ability to indicate any unauthorized tampering which, nonetheless, has taken place. Warranty claims against the respective manufacturer are regularly asserted improperly by any such unauthorized tampering or intervention because the manufacturer cannot be held responsible for manipulations that have taken place after the unauthorized opening of the apparatus. In certain cases, great consequential damages can be avoided by a completely satisfactory functioning of the apparatus enclosed by the housing parts which might otherwise occur in case of an unauthorized manipulation under certain circumstances; incalculable liability claims may be asserted against the manufacturer by reason of the product liability, which the manufacturer can defeat only in the case of a completely satisfactory indication of a manipulation. The reasons for such manipulations are in part unknown; however, it is a fact that they occur.

In a prior art riveting arrangement of the housing parts, the rivets were drilled out for opening the housing and the parts were again properly closed during the closing of the apparatus by commercially available rivets so that an indication of a manipulation or tampering was not possible. Frequently such housing parts are also screwed together and the screws are secured by an appropriate sealing material such as lacquer. However, also in such a case it is not always possible to indicate an unauthorized opening of the housing because after a careful removal of the old sealing lacquer residues and after an application of a new sealing lacquer of the same quality, the apparatus can again be sealed properly. The use of a seal, such as a lead seal or plaster seal, does not provide a certain indication of any possible unauthorized opening because a seal may also be torn off occasionally by inattention when working in the proximity of such an apparatus.

It is conceivable to glue together the housing parts with each other in such a manner that they can be opened only destructively in every case; however, in that case no authorized service or maintenance operations in connection with the parts enclosed by the housing are then possible. The same is also true for a welded connection of the housing parts which would be possible in the case of a construction of the two housing parts of thermoplastic synthetic resinous material.

It is the object of the present invention to so construct the safety arrangement of the aforementioned type that in every case of an unauthorized opening of the housing parts such an intervention or tampering can be indicated with certainty.

The underlying problems are solved according to the present invention in that with a construction of the housing parts of aluminum and/or plastic materials, the safety rivet consists of a preferably alloyed steel, and in that the rivet end is peened over loosely, though without play, in such a manner that the peened-over safety rivet is easily rotatable. Owing to the great material hardness of the safety rivet compared to the hardness of the housing material, the rivet cannot be removed tracelessly and replaced during the closing of the housing by a new safety rivet of the same type; instead, by reason of the great hardness of the safety rivet, scoring traces or grinding traces can be recognized at the housing walls, insofar as the safety rivet can be removed at all. More particularly, an appropriate constructional realization provides that the safety rivet consisting of alloyed steel is riveted only loosely so that it rotates in the rivet hole during the attempt of drilling it out and therefore cannot be drilled out. By reason of the recessed or countersunk arrangement of the rivet ends, the rivet cannot be held fast by means of pliers.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
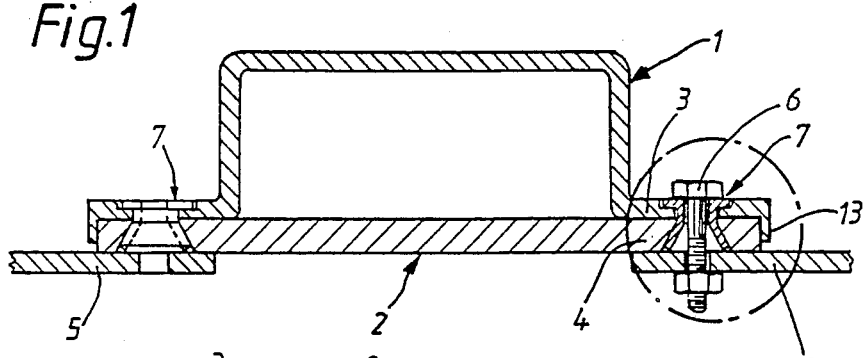
FIG. 1 is a cross-sectional view through housing parts flange-like connected with each other, which are connected with each other by safety rivets.

Referring now to the drawing wherein like reference numerals are used throughout the various views to designate like parts, the housing illustrated in FIG. 1 consists of a plate-shaped housing bottom part 2 and of a hat-shaped housing upper part 1. The wall parts 3 and 4 which are constructed flange-like are connected with each other in the edge area and are screwed-together in this flange area with a retaining wall 5 by means of fastening bolts 6. In the illustrated embodiment, safety rivets 7 are provided in the flange area at two mutually oppositely disposed places, which will be discussed in detail hereinafter. It should only be mentioned at this point that the rivets also assume a connecting function of the two housing parts but that the main purpose of their utilization is the assurance of being able to indicate any unauthorized opening. The two housing parts are held together essentially by the bolts 6, by means of which the housing parts are also bolted to the support wall 5.

In order not to be able to apply externally a sharp work tool, such as, for example, a knife or a sharp screwdriver for spreading apart the two wall parts at the separating joint 12 between the two wall parts 3 and 4, the separating joint 12 between the wall parts is hidden at the outer edge and is covered by means of an apron 13. This apron 13 provided at the upper housing part 1 surrounds without play the outer edge of the housing bottom part 2 so that the separating joint 12 is inaccessible from the outside. As a result thereof, the separating joint 12 is also protected against penetration of moisture or the like.

Figure 2:
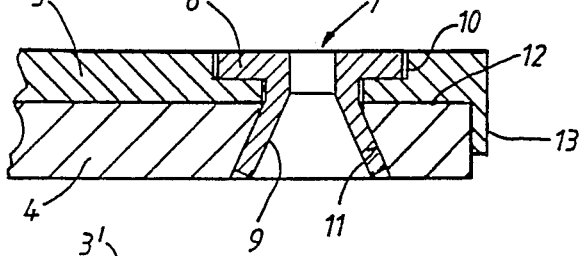
FIGS. 2 to 5 are partial cross-sectional views through different embodiments of safety rivets in accordance with the present invention.

In the embodiment illustrated in FIG. 2, which represents an enlarged detail illustration of the flange-like detail of the housing indicated in FIG. 1 by the dash-and-dotted circle, the safety rivet 7 is constructed as hollow rivet which carries a prefabricated rivet end 8 with flat head. The wall part 3 coordinated to the housing upper part 1 includes a flat cylindrical countersunk recess 10 for the accommodation of the flat-head-like rivet end 8 in which the latter can be completely recessed.

The safety rivet 7 which is constructed hollow, is constructed in the inner diameter so large that the fastening bolt 6 can be readily extended therethrough. By reason of such a construction, an additional hole for a safety rivet can be economized; additionally, the relatively large safety rivet conditioned thereby becomes still more safe against drilling out because a drilling out is the more difficult the larger the safety rivet is in diameter. The torques for drilling out increase with increasing size whereas the forces, with which the only loosely fixedly peened safety rivet is held fast at the flange-like wall parts 3 and 4, are relatively small and are far-reachingly independent of the rivet diameter. As to the rest, a hollow rivet can be peened over more easily than a solid rivet.

The housing bottom part 4 includes a conical countersunk recess 11 for the accommodation of the rivet end 9 to be peened over, into which the initially still hollow cylindrical stem of the safety rivet is wedged over with a corresponding cone and the safety rivet is peened over in this manner. Attention should be paid thereby only to the fact that the rivet end 9 is peened over not too securely, though without play, but instead can still be rotated possibly. As a result thereof, a safe protection against drilling out of the safety rivet is provided. It is also conceivable in principle to peen over also the lower rivet end up to the formation of a flat head, however, with the high material hardness this is not necessary, on the one hand, and is also not readily possible, on the other. Apart therefrom, by reason of the high material hardness of the safety rivet, also the wall parts 3 and 4 would deform in an uncontrollable manner within the area of the countersunk recess.

Figure 4:
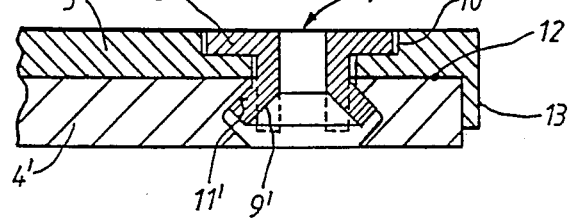

The use of a high-strength steel material for the safety rivet 7, as it is proposed in FIGS. 2 and 4, is proposed as further protection against drilling out the safety rivet, whereby one starts with the premise that the two wall parts 3 and 4 consist of plastic material or aluminum which have a considerably lesser hardness than the material of the safety rivet. Owing to the great hardness of the safety rivet in comparison to the material of the wall parts and by reason of the only loose peening-over of the safety rivet, the latter, in case of an attempt of drilling-out the rivet, leaves with certainty abrasion traces at the wall parts which, even if the rivet should be split by the use of a micro-separating disk following an unsuccessful drilling-out attempt, remain recognizable and point toward an unauthorized intervention.

A further significant feature for the protection against drilling-out, in addition to the high hardness and the only loose peening-over of the safety rivet, also resides in the fact that the two rivet ends are accommodated completely in countersunk recesses 10, respectively, 11 so that it is not possible to hold the safety rivet fast against rotation by means of pliers during the attempt to drill-out the same. The upper rivet end 8 should therefore fit as closely as possible into the associated flat cylindrical countersunk recess 10. Similarly, it is important that the lower peened-over rivet end 9 does not protrude out of the conical countersunk recess 11; the safety rivet must therefore be carefully matched to the thickness of the two wall parts 3 and 4.

Figure 3:
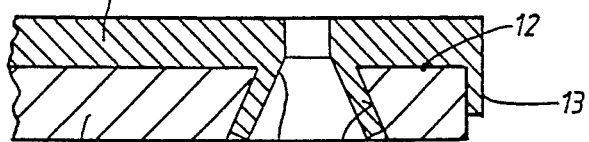

In the embodiment illustrated in FIG. 3, the safety rivet 7' is integrated with the upper wall part 3' consisting, for example, of aluminum and forms with the same a one-piece integral workpiece. The high material hardness of the safety rivet discussed hereinabove is not provided in this case; additionally, the safety rivet 7' is also not freely rotatable. Nonetheless, an unauthorized opening of the housing can be proved in that case without difficulty in that the workpiece-integrated safety rivet 7' is missing in the event of a drilling-out attempt and can be replaced during the reclosing of the housing only by a different separate rivet.

In the embodiment illustrated in FIG. 4, the countersunk recess 11' provided in the lower wall part 4' is constructed double-conically, and the safety rivet 7' is selected somewhat shorter than in the embodiment according to FIG. 2. Owing to the double-conical construction of the countersunk recess 11', the outer edge of the peened-over rivet end 9' is protected better against the engagement by a work tool, with which the peened-over end could be bent back again into the cylindrical shape indicated in dash-and-dotted lines. More particularly, if the peened-over end could be pressed back at a circumferential place into the cylindrical shape, pliers could be readily applied at the same, by means of which the safety rivet could be held fast so that it could be drilled out without visible consequences in the wall part. It is also conceivable to bend little-by-little also other circumferential places of the peened-over end 9' into the cylindrical position so that the rivet can finally be pressed out of the rivet opening, as a result of which the safety rivet could be removed without visible traces at the workpiece.

Figure 5:
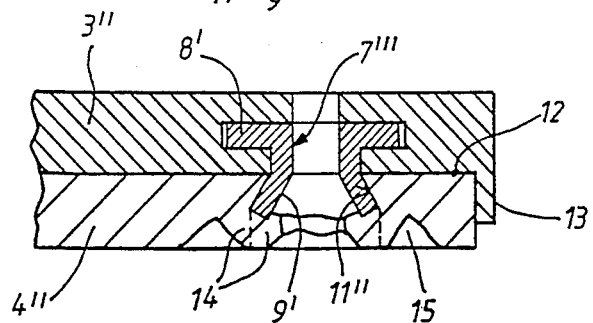

The embodiment according to FIG. 5 offers a greater protection against such manipulations. The safety rivet 7''' is cast with its upper flat rivet end 8' which is serrated along the outer edge into the upper wall part 3' and is integrated with the same, so to speak of. A certain protection against rotation also exists in this case; however, by reason of the integrated arrangement of the safety rivet, a removal of the safety rivet is impossible without visible consequences. The countersunk recess 11' in the lower wall part 4' is cylindrically conical in the original condition. After the peening-over of the lower rivet end 9'——also in this embodiment a shortened safety rivet must be used——an annular groove 15 is pressed about the original recess 11' in the course of the tumbler riveting method by means of an annular knife-edge-like work tool and the edge thereof is thereby pressed over the edge of the peened-over rivet end 9' so that it completely surrounds this rivet end. By an additional impact or blow by means of a conically shaped tool, the arched edge material can be pressed into the conically shaped peened-over lower rivet end 9', as shown in FIG. 5. The safety rivet is completely surrounded thereby and is no longer accessible in any manner by means of tools.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A safety rivet arrangement for indicating an unauthorized opening of housing parts including a housing in which wall parts of the housing enclose a space and are connected at a formed by flanges on each of said wall parts, one of said wall parts having an apron integral therewith extending over the separating joint and engaging the flange of the other of said wall parts, the wall parts enclosing the space being riveted together by at least one safety rivet which can be removed only destructively and which is made of a harder material than the material of at least one of the connected wall parts, the safety rivet consisting of steel, wherein a construction of at least one of the housing wall parts is of an aluminum or plastic material and the rivet having ends, one of which ends is peened-over in such a manner that the rivet is readily rotatable without any play.

2. A safety rivet arrangement according to claim 1, wherein the safety rivet consists of alloyed steel.

3. A safety rivet arrangement for indicating an unauthorized opening of housing parts including: a housing in which wall parts enclose a space and are connected at a separating joint formed by flanges on each of said wall parts, one of said wall parts having an apron integral therewith extending over the separating joint and engaging the flange of the other of said wall parts, the wall parts enclosing the space being riveted together by at least one safety rivet of a material harder than the material of at least one of the connected wall parts and removable only by destruction, and wherein the safety rivet is integrated in one piece with the harder one of the housing parts.

4. A safety rivet arrangement according to claim 3, wherein the safety rivet consists of the same material as the harder one of the housing parts.

5. An arrangement according to claim 1, wherein the safety rivet is recessed at the peened-over rivet end in a countersunk recess in one of the wall parts and is formlockingly surrounded by peened-over edge material of the countersunk recess.

6. An arrangement according to claim 5, wherein the peened-over rivet end and the associated countersunk recess in the wall part are constructed conically.

7. An arrangement according to claim 6, wherein the safety rivet is cast with a prefabricated head in the material of the one of the housing parts.

8. An arrangement according to claim 7, wherein the separating joint between the connected housing parts is arranged hidden along the outer edge thereof by the apron, said apron with one of the housing wall parts.

9. An arrangement according to claim 1, wherein both rivet ends are arranged recessed in the wall parts.

10. An arrangement according to claim 2, wherein the peened-over rivet end is recessed with respect to a corresponding wall part.

11. An arrangement according to claim 1, wherein the peened-over rivet end is recessed with respect to a corresponding wall part.

12. A safety rivet arrangement for indicating an unauthorized opening of housing parts including a housing in which wall parts of the housing enclose a space and are connected at a separating joint formed by flanges on each of said wall parts, one of said wall parts having an apron integral therewith extending over the separating joint and engaging the flange of the other of said wall parts, the wall parts enclosing the space being riveted together by at least one safety rivet having a prefabricated head and which can be removed only destructively and which is made of harder material than the material of at least one of the connected wall parts, the safety rivet consisting of steel, wherein a construction of at least one of the housing parts is of an aluminum or plastic material and being cast with its prefabricated head in the material of the associated housing part.

13. An arrangement according to claim 1, wherein the separating joint between the connected housing parts is arranged hidden along the outer edge thereof by the apron, said apron integral with one of the housing wall parts.

14. An arrangement according to claim 1, wherein the peened-over rivet end and the associated recess in the wall part are constructed conically.

* * * * *